Feb. 6, 1923.
L. BADOIS
CLUTCH
Filed Apr. 20, 1920
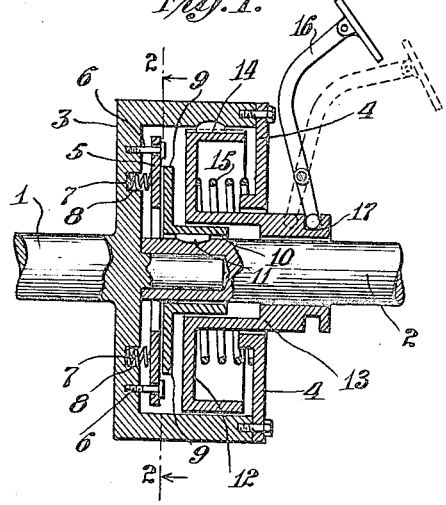
Fig.1.
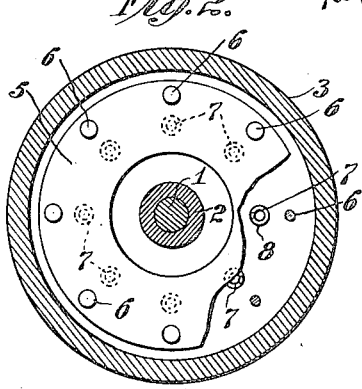
Fig.2.
Fig.5.
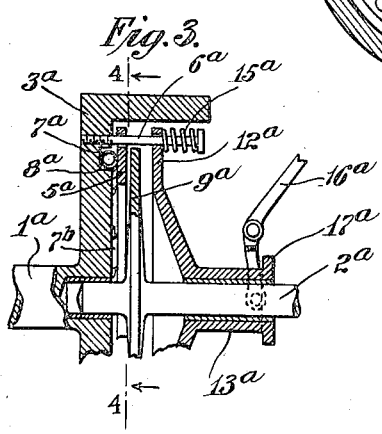
Fig.3.
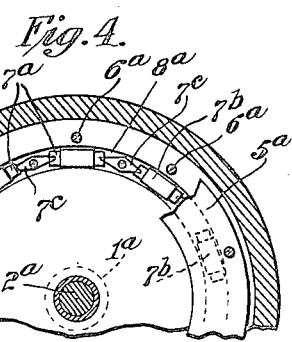
Fig.4.
Louis Badois
INVENTOR
BY Wm B. Whitney
ATTORNEY Patented Feb. 6, 1923.

1,444,361

UNITED STATES PATENT OFFICE.

LOUIS BADOIS, OF PARIS, FRANCE.

CLUTCH.

Application filed April 20, 1920. Serial No. 375,216.

*To all whom it may concern:*

Be it known that I, LOUIS BADOIS, a citizen of the Republic of France, residing in the city of Paris, in the Department of the Seine, France, have invented certain new and useful Improvements in Clutches, of which the following is a specification.

The present invention relates to friction clutches of a type in which two or more clutch members are brought together and held in frictional engagement by a spring or springs, to operatively couple together two parts, and are released from such engagement, to uncouple the parts, by a lever operated commonly by a pedal.

In clutches of this type, as heretofore constructed, the actuation of the lever to release the parts completely nullifies the action of the clutch spring; and in all cases a progressive application of the clutch is obtained in one of two ways, very difficult to control either by the elasticity of the surfaces which are brought into contact and the flexibility of the actuating parts or by the insertion of some suitable lubricating material between the friction members.

With the object of remedying such defect, my invention consists, broadly stated, in the introduction of an additional auxiliary spring or springs, having a very limited play, to exert upon the friction members a pressure in an opposite direction to, and of a value slightly less than, that exerted upon these members by the clutch spring, thereby resolving the coupling action of the clutch into two phases—a first phase, in which, as the uncoupling lever is allowed to move, the clutch is thrown in by an initial and gradually increasing pressure due to the compression of the additional spring or springs, to first start and then if necessary gradually accelerate the speed of the driven part, and a second phase, in which, on the release of the uncoupling lever, the clutch spring is freed and acts in the usual manner to securely couple together the parts.

The invention will be understood by reference to the accompanying drawings wherein is shown, for purposes of illustration merely, two embodiments thereof as applied to a friction plate clutch suitable for use in a motor car, in which—

Figure 1 is a view of my improved clutch in longitudinal section; Fig. 2 is a section on the line 2 2 of Fig. 1, with parts broken away; Figs. 3 and 4 are broken views, in longitudinal section and in section on the line 4 4 of Fig. 3, respectively, of a modified form of the clutch; and Fig. 5 is a detail perspective view of one of the auxiliary springs made use of in the clutch shown in Figs. 3 and 4.

Referring first to Figs. 1 and 2, the shaft 1, the reduced end of which provides a bearing for the second shaft 2, carries the clutch box or cylindrical housing 3 which is closed at its outer end by an annular plate 4. On the inner face of the clutch box an annular friction plate 5 is mounted to rotate therewith by means of studs 6 which allow the plate to slide thereon to a limited extent, say one to two millimeters; and the plate is normally pressed forward and yieldingly held against the heads of the studs by the auxiliary springs 7, having in the aggregate a value somewhat less than that of the clutch spring, set in sockets 8 in the face of the clutch box. In front of this plate is a second friction plate 9 carried by a sleeve 10 which is keyed at 11 to slide on and rotate with the shaft 2. A third or follower plate 12, which is slidably and rotatably carried by a sleeve 13 on the shaft 2 and is keyed at its flanged rim 14 to the rim of the clutch box to slide in and rotate therewith, is normally pressed backward from the plate 4 by the clutch spring 15 interposed between these two parts. The uncoupling lever 16, bearing at its lower end in an annular groove 17 around the outer end of the sleeve, serves to draw the follower plate forward against the action of the clutch spring and thereby release the friction plates.

In the modified form shown in Figs. 3 and 4, the end of the shaft 2ª is journaled within the adjacent end of the shaft 1ª, which carries the clutch box 3ª. The follower plate 12ª, as well as the annular plate 5ª and the several sections 15ª of what constitutes the main clutch spring as here made, are mounted to slide upon the studs 6ª which are set in the inner face of the clutch box and are extended for the purpose. The intermediate friction plate 9ª is here made integral with the shaft 2ª, which is given the necessary sliding movement within its bearing in the shaft 1ª. The auxiliary springs 7ª, each consisting of a strip of tempered steel which is rolled up and inserted in a deformable but inextensible sleeve 7ᵇ of thin metal such as brass within which it is confined, are set in an annular socket or groove 8ª in the face of the clutch box and there held in place by clips 7ᶜ secured at the bottom of the socket with ends extending into the ends of adjoining springs. The bifurcated lower end of the uncoupling lever 16ª bears against the flanged end 17ª of the sleeve 13ª of the follower plate. The special auxiliary springs here shown, which are of my own invention, are peculiarly adapted for the purpose as their range of action is prescribed by the sleeve within which they are confined and they are capable of being made of the exact value required by giving to the rolled spring strip the necessary length and width.

In the operation of the clutch, it is evident that, as the pressure on the pedal of the uncoupling lever is relaxed, the clutch spring or sections of spring will thrust the follower plate back against the middle plate and then force that plate into frictional engagement with the rear plate under a pressure which at first is light but gradually increases as the auxiliary springs behind the plate are compressed until, when the lever is entirely released, the main clutch spring or sections of spring acting through the intermediate plates will force the rear plate against the face of the coupling box and lock the parts together. Thus, in operating a car for example, there will be first a position of the pedal at which the car will start and then succeeding positions at which it will gradually pick up speed in a sure and progressive way under the action of the auxiliary springs, and, finally, the pedal being released, the effect of these springs will be increased by the superior force of the clutch spring or sections of spring and the friction surfaces brought together to produce the coupling in the usual way.

Having explained the principle of my improved clutch, and described the best mode in which I have contemplated applying that principle, what I claim as new, and desire to secure by Letters Patent, is—

1. A friction clutch comprising two clutch members, a clutch box carried by one clutch member providing on its inner face a substantially flat annular surface, a friction plate mounted to move axially within and to rotate with the clutch box, a plurality of springs set into the inner face of the clutch box and acting normally to yieldingly hold the friction plate out of contact therewith, a second friction plate mounted adjacent the first plate to move axially within the clutch box and to rotate with the second clutch member, and actuating means adapted under control to move the second friction plate first into contact with the first friction plate and then by a further movement to force the said first plate against the inner surface of the clutch box.

2. A friction clutch comprising a driving shaft carrying a clutch box, a shaft to be driven, three annular friction plates slidingly mounted within the clutch box the inner and outer plates to rotate therewith and the intermediate plate to rotate with the driven shaft, a main spring means bearing against the back of the outer plate and normally tending to press it forward against the intermediate plate and thereby to press the intermediate plate against the inner plate and the inner plate against the inner face of the clutch box, means for drawing back the outer plate and thereby contracting the main-spring means and a plurality of auxiliary springs of an aggregate value slightly less than the value of the main spring means set into the inner face of the clutch box and bearing against the adjacent face of the inner plate, and tending normally to hold these two friction surfaces slightly out of contact.

L. BADOIS.